(12) United States Patent
Wimbush, Sr.

(10) Patent No.: US 10,433,495 B2
(45) Date of Patent: Oct. 8, 2019

(54) TRELLIS ASSEMBLY

(71) Applicant: Bennie Lee Wimbush, Sr., Fort Lauderdale, FL (US)

(72) Inventor: Bennie Lee Wimbush, Sr., Fort Lauderdale, FL (US)

( * ) Notice: Subject to any disclaimer, the term of this patent is extended or adjusted under 35 U.S.C. 154(b) by 270 days.

(21) Appl. No.: 15/491,581

(22) Filed: Apr. 19, 2017

(65) Prior Publication Data

US 2018/0303043 A1    Oct. 25, 2018

(51) Int. Cl.
*A01G 17/06*        (2006.01)
*A01G 17/10*        (2006.01)

(52) U.S. Cl.
CPC ............. *A01G 17/06* (2013.01); *A01G 17/10* (2013.01)

(58) Field of Classification Search
CPC ................................ A01G 17/06; A01G 9/124
See application file for complete search history.

(56) References Cited

U.S. PATENT DOCUMENTS

| | | |
|---|---|---|
| 52,205 A | 1/1866 | Rickey |
| 619,379 A | 2/1899 | Murray |
| 878,494 A | 2/1908 | Basse |
| 1,063,502 A | 6/1913 | Bryan |
| 1,601,481 A * | 9/1926 | Schreiber ............... A01G 17/06 47/47 |
| 2,467,265 A * | 4/1949 | Linamen ............... A01G 17/06 47/47 |
| 2,725,676 A * | 12/1955 | Pucci ..................... A01G 17/06 47/47 |
| 2,788,615 A * | 4/1957 | Hauser ................... A01G 17/06 47/47 |
| 3,166,869 A * | 1/1965 | Luper .................... A01G 17/06 47/47 |
| 3,337,988 A | 8/1967 | Burton |
| 6,378,245 B1 | 4/2002 | Summers |
| 2003/0097788 A1* | 5/2003 | Pierce, Jr. ............. A01G 17/06 47/47 |
| 2018/0084737 A1* | 3/2018 | Wills ..................... A01G 9/122 |

* cited by examiner

*Primary Examiner* — Monica L Williams

(57) ABSTRACT

A trellis assembly for decorative trellizing of vines includes a base that is configured to position in soil. A bar is coupled to and extends bidirectionally from a top of the base. The bar is arcuate. A plurality of rods is coupled to and extends radially from the bar. The rods are substantially coplanar. Each rod has a plurality of fasteners that is coupled to and extends from the rod. The fasteners are configured to couple to vines to trellis the vines.

19 Claims, 5 Drawing Sheets

TRELLIS ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to trellis assemblies and more particularly pertains to a new trellis assembly for decorative trellising of vines.

BRIEF SUMMARY OF THE INVENTION

An embodiment of the disclosure meets the needs presented above by generally comprising a base that is configured to position in soil. A bar is coupled to and extends bidirectionally from a top of the base. The bar is arcuate. A plurality of rods is coupled to and extends radially from the bar. The rods are substantially coplanar. Each rod has a plurality of fasteners that is coupled to and extends from the rod. The fasteners are configured to couple to vines to trellis the vines.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
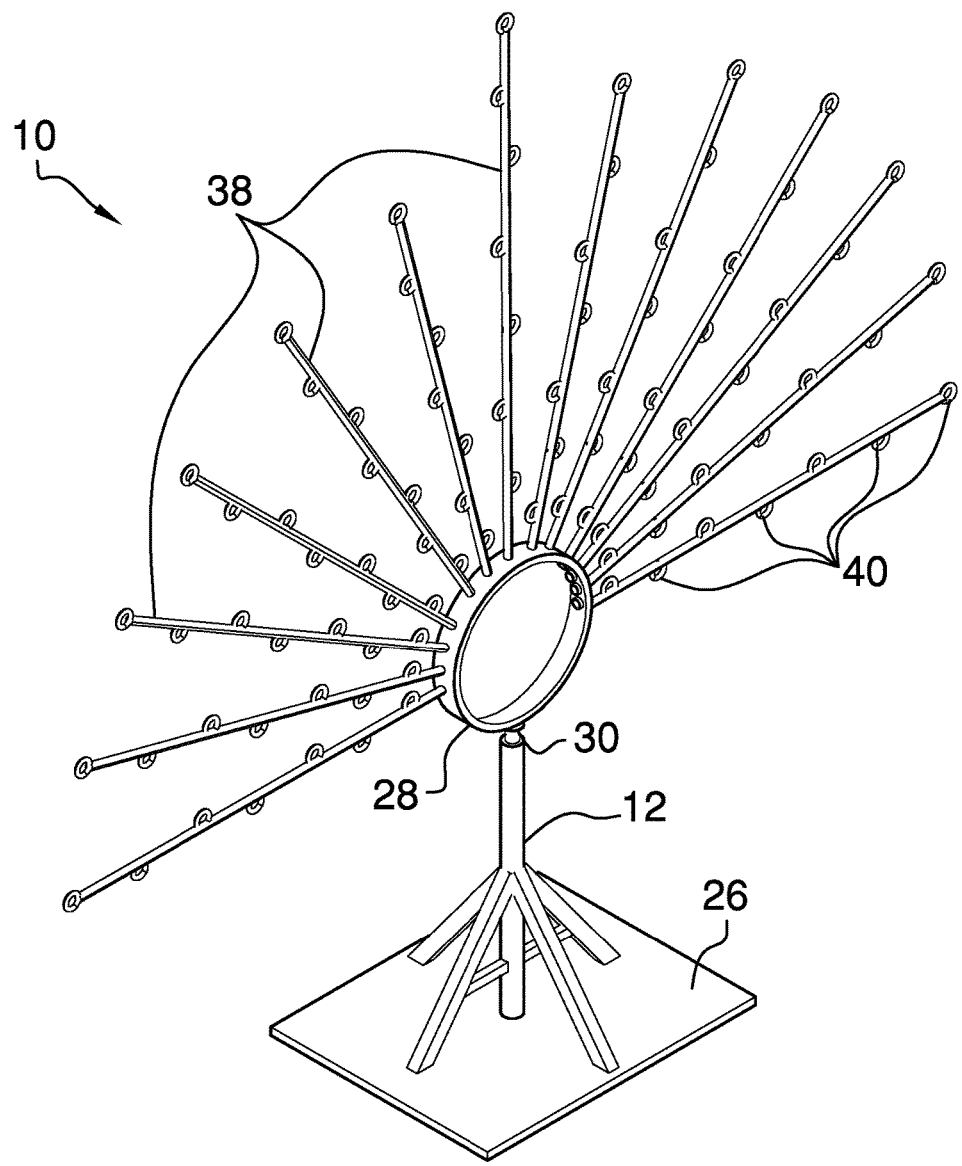
FIG. 1 is an isometric perspective view of a trellis assembly according to an embodiment of the disclosure.
Figure 2:
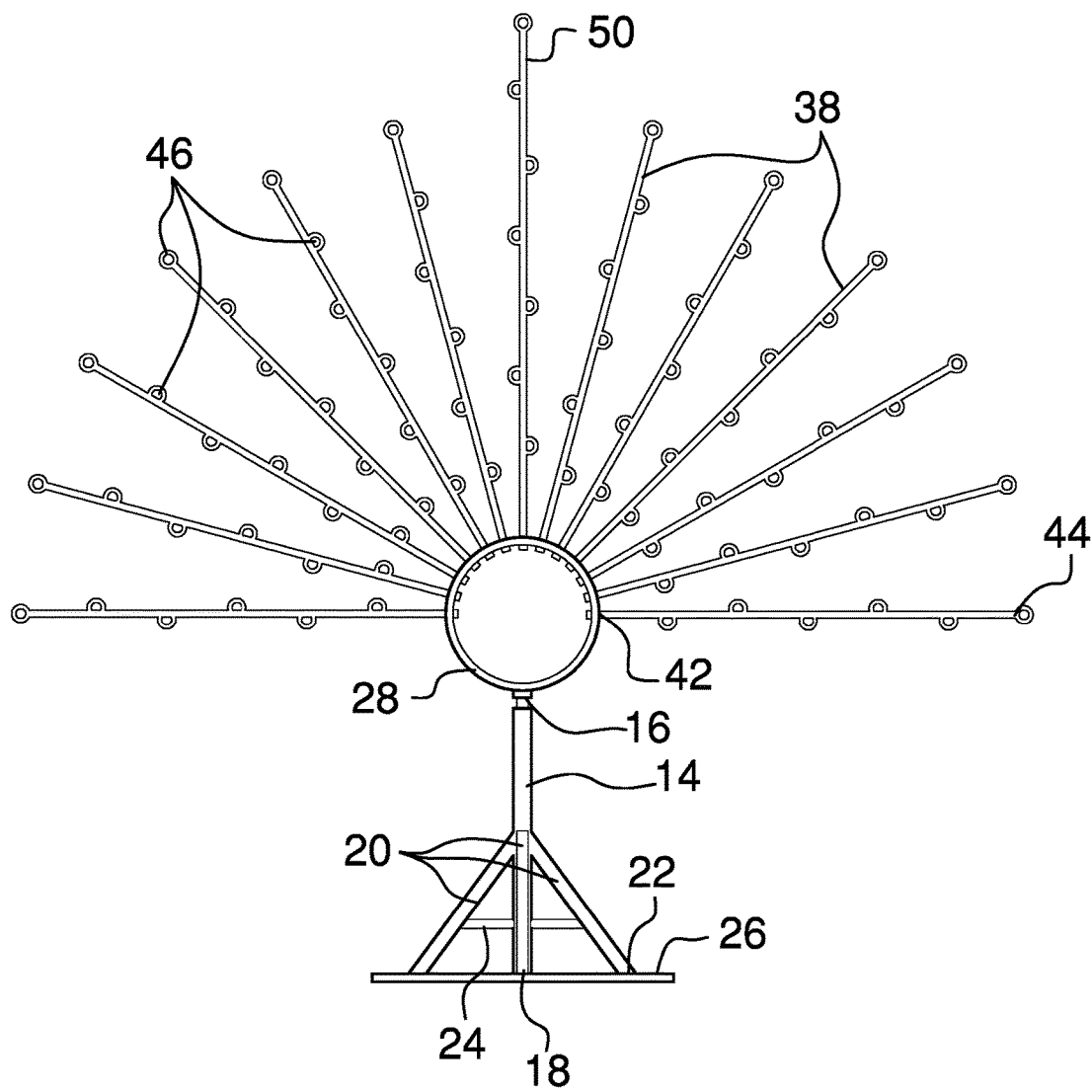
FIG. 2 is a front of an embodiment of the disclosure.
Figure 3:
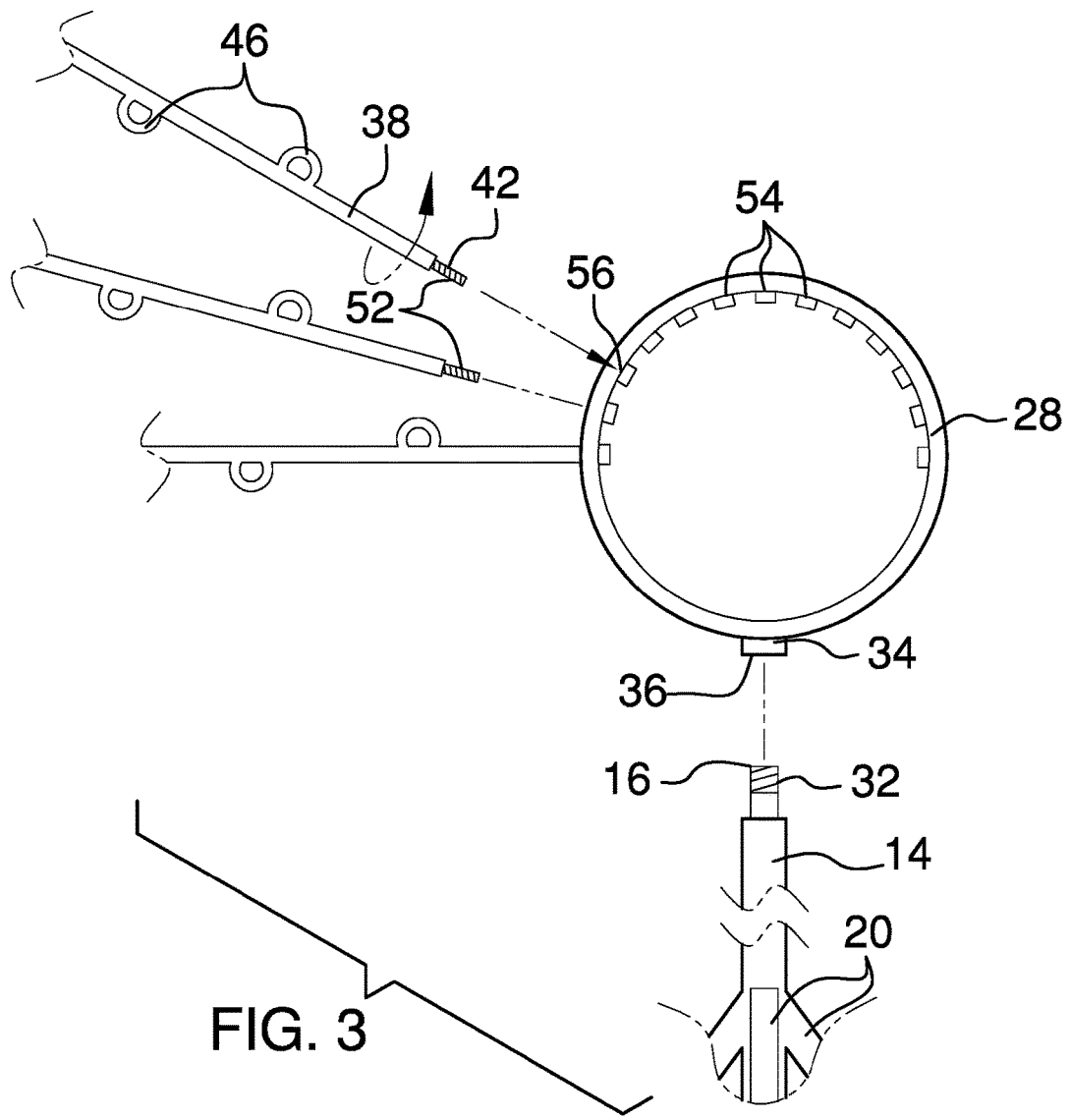
FIG. 3 is an exploded view of an embodiment of the disclosure.
Figure 4:
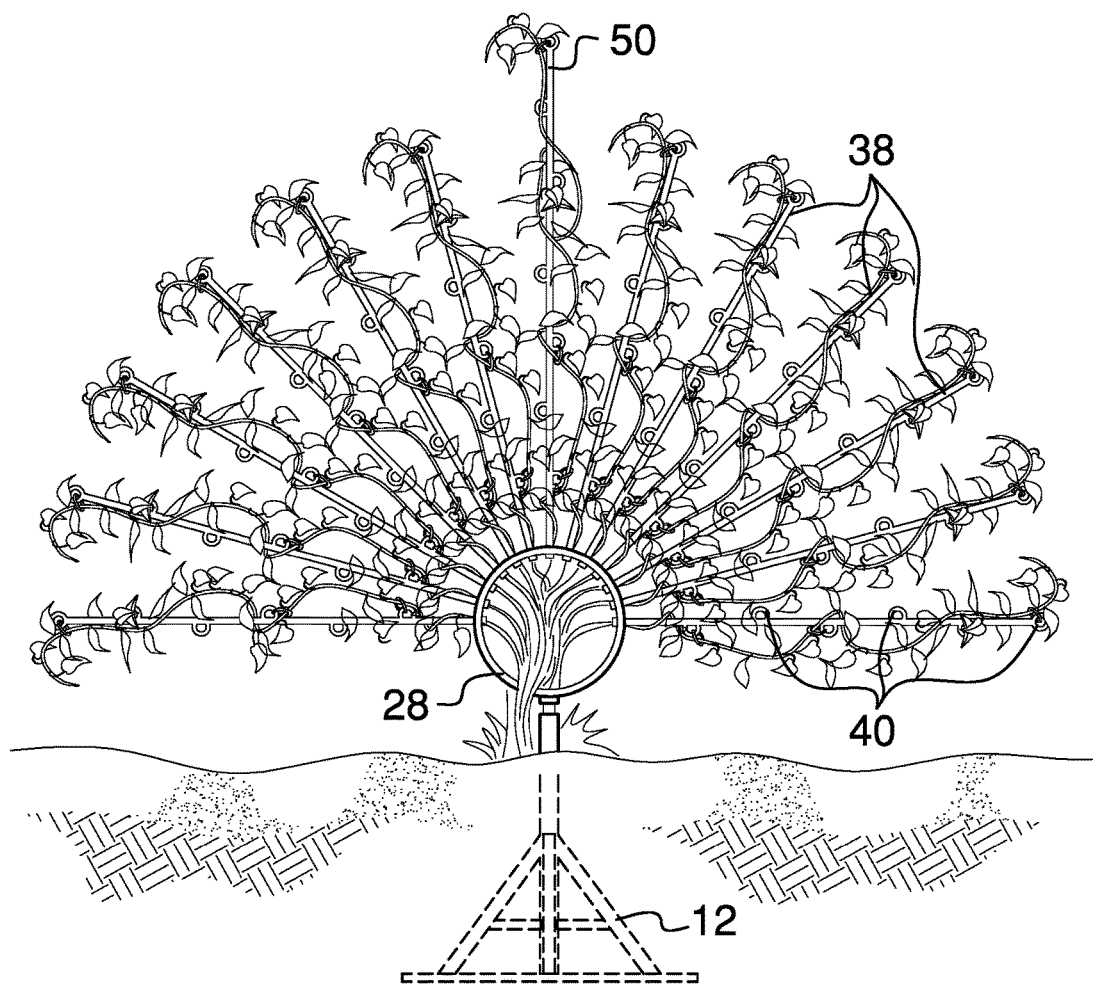
FIG. 4 is an in-use view of an embodiment of the disclosure.
Figure 5:
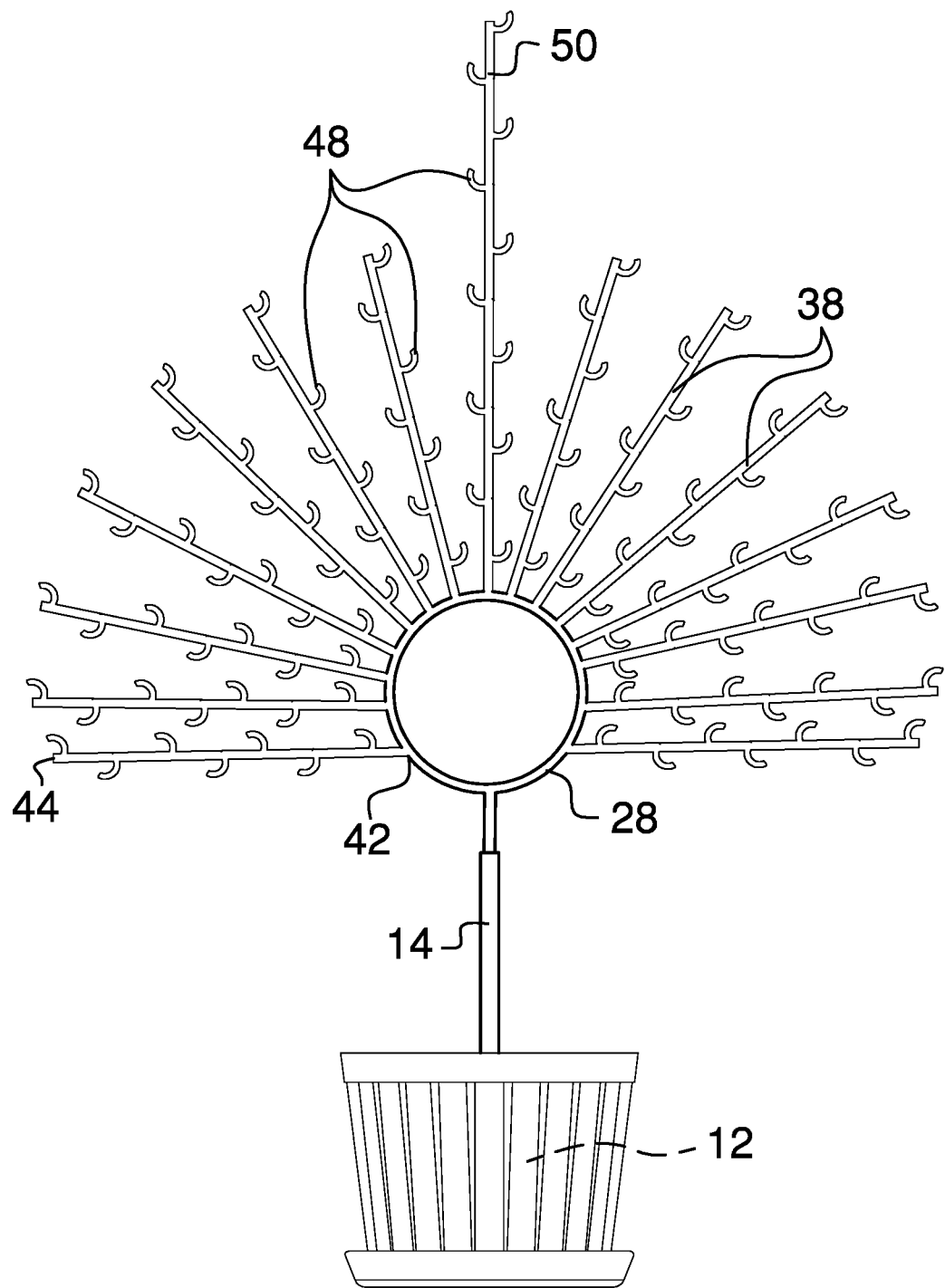
FIG. 5 is a front view of an embodiment of the disclosure.

With reference now to the drawings, and in particular to FIGS. 1 through 5 thereof, a new trellis assembly embodying the principles and concepts of an embodiment of the disclosure and generally designated by the reference numeral 10 will be described.

As best illustrated in FIGS. 1 through 5, the trellis assembly 10 generally comprises a base 12 that is configured to position in soil. In one embodiment, the base 12 comprises metal. In another embodiment, the base 12 comprises a first post 14 that has an upper end 16 and a lower end 18. A plurality of second posts 20 is coupled to and extends transversely from the first post 14 such that bottom ends 22 of the second posts 20 are substantially coplanar with the lower end 18 of the post. The second posts 20 are positioned substantially equally distant from the upper end 16 and the lower end 18 of the first post 14. The second posts 20 and the first post 14 are configured to position in the soil with the upper end 16 of the first post 14 protruding from the soil.

In yet another embodiment, a third post 24 is coupled to and extends between the first post 14 and a pair of opposingly positioned second posts 20. In still yet another embodiment, a plate 26 is coupled to the first post 14 at the lower end 18 and the second posts 20 at the bottom ends 22. The plate 26 is substantially rectangularly shaped.

A bar 28 is coupled to and extends bidirectionally from a top 30 of the base 12. The bar 28 is arcuate. In one embodiment, the bar 28 is circularly shaped. In another embodiment, the bar 28 comprises metal.

A first coupler 32 is coupled to the top 30 of the base 12. A second coupler 34 is coupled to the bar 28. The second coupler 34 is complementary to the first coupler 32. The second coupler 34 is positioned to couple to the first coupler 32 to couple the bar 28 to the base 12. In one embodiment, the second coupler 34 comprises a ring 36. The ring 36 and the upper end 16 of the first post 14 are complementarily threaded. The ring 36 is positioned to threadedly insert the upper end 16 of the first post 14 to couple the bar 28 to the first post 14.

Each of a plurality of rods 38 is coupled to and extends radially from the bar 28. The rods 38 are substantially coplanar. In one embodiment, the rods 38 comprise metal. Each rod 38 has a plurality of fasteners 40 that is coupled to and extends from the rod 38. The fasteners 40 are configured to couple to vines to trellis the vines.

In one embodiment, each plurality of fasteners 40 is substantially evenly spaced between a first end 42 and a second end 44 of a respective rod 38. In another embodiment, the fasteners 40 are alternately opposingly positioned on the rod 38. In yet another embodiment, the fasteners 40 comprise eyelets 46. In still yet another embodiment, the fasteners 40 comprise hooks 48. In still yet another embodiment, each plurality of fasteners 40 comprises from three to eleven fasteners 40. In still yet another embodiment, each plurality of fasteners 40 comprises from five to nine fasteners 40. In still yet another embodiment, each plurality of fasteners 40 comprises seven fasteners 40.

In one embodiment, the plurality of rods 38 comprises from seven to nineteen rods 38. In another embodiment, the plurality of rods 38 comprises from ten to sixteen rods 38. In yet another embodiment, the plurality of rods 38 comprises thirteen rods 38. In still yet another embodiment, the plurality of rods 38 comprises a center rod 50. The center rod 50 is dimensionally longer than adjacent rods 38.

Each of a plurality of first connectors 52 is coupled to the first end 42 of a respective rod 38. A plurality of second connectors 54 is coupled to the bar 28. The second connectors 54 are complementary to the first connectors 52. The second connectors 54 are positioned to couple to the first connectors 52 to couple the rods 38 to the bar 28. In one embodiment, each second connector 54 comprises a hole 56 that is positioned through the bar 28. The holes 56 and the first ends 42 of the rods 38 are complementarily threaded. The holes 56 are positioned in the bar 28 such that each hole 56 is positioned to threadedly insert the first end 42 of a respective rod 38 to couple the respective rod 38 to the bar 28.

In use, the second posts 20 and the first post 14 are configured to position in the soil with the upper end 16 of the first post 14 protruding from the soil. The ring 36 that is positioned on the bar 28 is positioned to threadedly insert the upper end 16 of the first post 14 to couple the bar 28 to the first post 14. Each hole 56 that is positioned in the bar 28 is positioned to threadedly insert the first end 42 of the respective rod 38 to couple the respective rod 38 to the bar 28. The eyelets 46 and the hooks 48 that are positioned on the rods 38 are configured to couple to the vines to trellis the vines.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trellis assembly comprising:
    a base configured for positioning in soil;
    a circularly shaped bar coupled to and extending bidirectionally from a top of said base;
    a plurality of rods, each rod being coupled to and extending radially from said bar, said rods being substantially coplanar;
    each said rod having a plurality of fasteners coupled to and extending from said rod; and wherein said fasteners are positioned on said rods such that said fasteners are configured for coupling to vines for trellising the vines.

2. The assembly of claim 1, further including said base, said bar and said rods comprising metal.

3. The assembly of claim 1, further including said base comprising:
    a first post having an upper end and a lower end;
    a plurality of second posts coupled to and extending transversely from said first post such that bottom ends of said second posts are substantially coplanar with said lower end of said post, said second posts being positioned substantially equally distant from said upper end and said lower end of said first post; and
    wherein said second posts are positioned on said first post such that said second posts and said first post are configured for positioning in the soil with said upper end of said first post protruding from the soil.

4. The assembly of claim 3, further including a third post coupled to and extending between said first post and a pair of oppositely positioned said second posts.

5. The assembly of claim 3, further including a plate coupled to said first post at said lower end and said second posts at said bottom ends, said plate being substantially rectangularly shaped.

6. The assembly of claim 1, further comprising:
    a first coupler coupled to said top of said base;
    a second coupler coupled to said bar, said second coupler being complementary to said first coupler; and
    wherein said second coupler is positioned on said bar such that said second coupler is positioned for coupling to said first coupler for coupling said bar to said base.

7. The assembly of claim 6, further including said second coupler comprising a ring, said ring and said upper end of said first post being complementarily threaded, wherein said ring is positioned on said bar such that said ring is positioned for threadedly inserting said upper end of said first post for coupling said bar to said first post.

8. The assembly of claim 1, further including each said plurality of fasteners being substantially evenly spaced between a first end and a second end of a respective said rod.

9. The assembly of claim 8, further including said fasteners being alternately opposingly positioned on said rod.

10. The assembly of claim 1, further comprising: said plurality of rods comprising from seven to nineteen said rods; and each said plurality of fasteners comprising from three to eleven said fasteners.

11. The assembly of claim 10, further comprising: said plurality of rods comprising from ten to sixteen said rods; and each said plurality of fasteners comprising from five to nine said fasteners.

12. The assembly of claim 11, further comprising: said plurality of rods comprising thirteen said rods; and each said plurality of fasteners comprising seven said fasteners.

13. The assembly of claim 1, further including said plurality of rods comprising a center rod, said center rod being dimensionally longer than adjacent said rods.

14. The assembly of claim 1, further including said fasteners comprising eyelets.

15. The assembly of claim 1, further including said fasteners comprising hooks.

16. The assembly of claim 1, further comprising: a plurality of first connectors, each said first connector being coupled to said first end of a respective said rod; a plurality of second connectors coupled to said bar, said second connectors being complementary to said first connectors;

and wherein said second connectors are positioned on said bar such that said second connectors are positioned for coupling to said first connectors for coupling said rods to said bar.

17. The assembly of claim 16, further including each said second connector comprising a hole positioned through said bar, said hole and said first ends of said rods being complementarity threaded, wherein said holes are positioned in said bar such that each said hole is positioned for threadedly inserting said first end of a respective said rod for coupling said respective said rod to said bar.

18. A trellis assembly comprising: a base configured for positioning in soil, said base comprising metal, said base comprising:
- a first post having an upper end and a lower end,
- a plurality of second posts coupled to and extending transversely from said first post such that bottom ends of said second posts are substantially coplanar with said lower end of said post, said second posts being positioned substantially equally distant from said upper end and said lower end of said first post, wherein said second posts are positioned on said first post such that said second posts and said first post are configured for positioning in the soil with said upper end of said first post protruding from the soil, a third post coupled to and extending between said first post and a pair of opposingly positioned said second posts, a plate coupled to said first post at said lower end and said second posts at said bottom ends, said plate being substantially rectangularly shaped;
- a bar coupled to and extending bidirectionally from a top of said base, said bar being arcuate, said bar being circularly shaped, said bar comprising metal;
- a first coupler coupled to said top of said base;
- a second coupler coupled to said bar, said second coupler being complementary to said first coupler, wherein said second coupler is positioned on said bar such that said second coupler is positioned for coupling to said first coupler for coupling said bar to said base, said second coupler comprising a ring, said ring and said upper end of said first post being complementarily threaded, wherein said ring is positioned on said bar such that said ring is positioned for threadedly inserting said upper end of said first post for coupling said bar to said first post;
- a plurality of rods, each rod being coupled to and extending radially from said bar, said rods being substantially coplanar, each said rod having a plurality of fasteners coupled to and extending from said rod, wherein said fasteners are positioned on said rods such that said fasteners are configured for coupling to vines for trellising the vines, each said plurality of fasteners being substantially evenly spaced between a first end and a second end of a respective said rod, said fasteners being alternately opposingly positioned on said rod, said plurality of rods comprising from seven to nineteen said rods, said plurality of rods comprising from ten to sixteen said rods, said plurality of rods comprising thirteen said rods, said plurality of rods comprising a center rod, said center rod being dimensionally longer than adjacent said rods, said rods comprising metal, each said plurality of fasteners comprising from three to eleven said fasteners, each said plurality of fasteners comprising from five to nine said fasteners, each said plurality of fasteners comprising seven said fasteners, said fasteners comprising eyelets;
- a plurality of first connectors, each said first connector being coupled to said first end of a respective said rod;
- a plurality of second connectors coupled to said bar, said second connectors being complementary to said first connectors, wherein said second connectors are positioned on said bar such that said second connectors are positioned for coupling to said first connectors for coupling said rods to said bar, each said second connector comprising a hole positioned through said bar, said hole and said first ends of said rods being complementarily threaded, wherein said holes are positioned in said bar such that each said hole is positioned for threadedly inserting said first end of a respective said rod for coupling said respective said rod to said bar; and wherein said second posts are positioned on said first post such that said second posts and said first post are configured for positioning in the soil with said upper end of said first post protruding from the soil, wherein said ring is positioned on said bar such that said ring is positioned for threadedly inserting said upper end of said first post for coupling said bar to said first post, wherein said holes are positioned in said bar such that each said hole is positioned for threadedly inserting said first end of said respective said rod for coupling said respective said rod to said bar, wherein said eyelets are positioned on said rods such that said eyelets are configured for coupling to the vines for trellising the vines.

19. The assembly of claim 18, further including said fasteners comprising hooks.

* * * * *